United States Patent
Cacciacarne

(10) Patent No.: US 6,550,104 B2
(45) Date of Patent: Apr. 22, 2003

(54) WHEELBARROW HANDLE ADAPTER

(76) Inventor: Ernest D. Cacciacarne, 5885 Backus Rd., Mojave, CA (US) 93501

( * ) Notice: Subject to any disclaimer, the term of this patent is extended or adjusted under 35 U.S.C. 154(b) by 29 days.

(21) Appl. No.: 09/799,659

(22) Filed: Mar. 6, 2001

(65) Prior Publication Data

US 2001/0047569 A1 Dec. 6, 2001

Related U.S. Application Data

(60) Provisional application No. 60/195,630, filed on Apr. 6, 2000.

(51) Int. Cl.$^7$ .................................................. B62B 5/06
(52) U.S. Cl. ............................ 16/426; D34/16; D34/27
(58) Field of Search ........................ 16/426, 422, 430, 16/112.1, 421, 427; D34/27, 16

(56) References Cited

U.S. PATENT DOCUMENTS

| 1,516,856 | A |  | 11/1924 | Johnson | |
| 3,404,427 | A |  | 10/1968 | Mack | 16/114 |
| 4,921,305 | A |  | 5/1990 | Steer | 298/3 |
| 5,149,116 | A |  | 9/1992 | Donze | 280/47.26 |
| 5,153,966 | A |  | 10/1992 | Godwin | 16/111 R |
| 5,273,331 | A | * | 12/1993 | Burnham | 294/50.8 |
| 5,421,060 | A | * | 6/1995 | Miller et al. | 16/427 |
| D362,100 | S | * | 9/1995 | McMurdo | D34/27 |
| 5,791,006 | A |  | 8/1998 | Anctil | 15/144.4 |
| 5,794,307 | A |  | 8/1998 | Overcash | 16/114 R |
| 5,810,375 | A |  | 9/1998 | Hoffarth | 280/47.31 |
| 6,099,025 | A |  | 8/2000 | Rohrs | 280/659 |
| 6,125,512 | A |  | 10/2000 | Weber | 16/430 |

* cited by examiner

Primary Examiner—Anthony Knight
Assistant Examiner—Doug Hutton
(74) Attorney, Agent, or Firm—Dennis W. Beech

(57) ABSTRACT

The wheelbarrow handle adapter has an adapter handle with a proximal end and a distal end with an approximate right angle bend therebetween. The adapter handle at the proximal end is attachable to a wheelbarrow handle. In one configuration a sleeve is inserted onto the end of the wheelbarrow handle and a handle bolt is inserted through the adapter handle intermediate the distal end and the proximal end to threadably engage the sleeve. In an alternate configuration the adapter handle having a tubular opening at the distal end is curved sufficiently at the distal end to insert the tubular opening onto the end of the wheelbarrow handle.

8 Claims, 2 Drawing Sheets

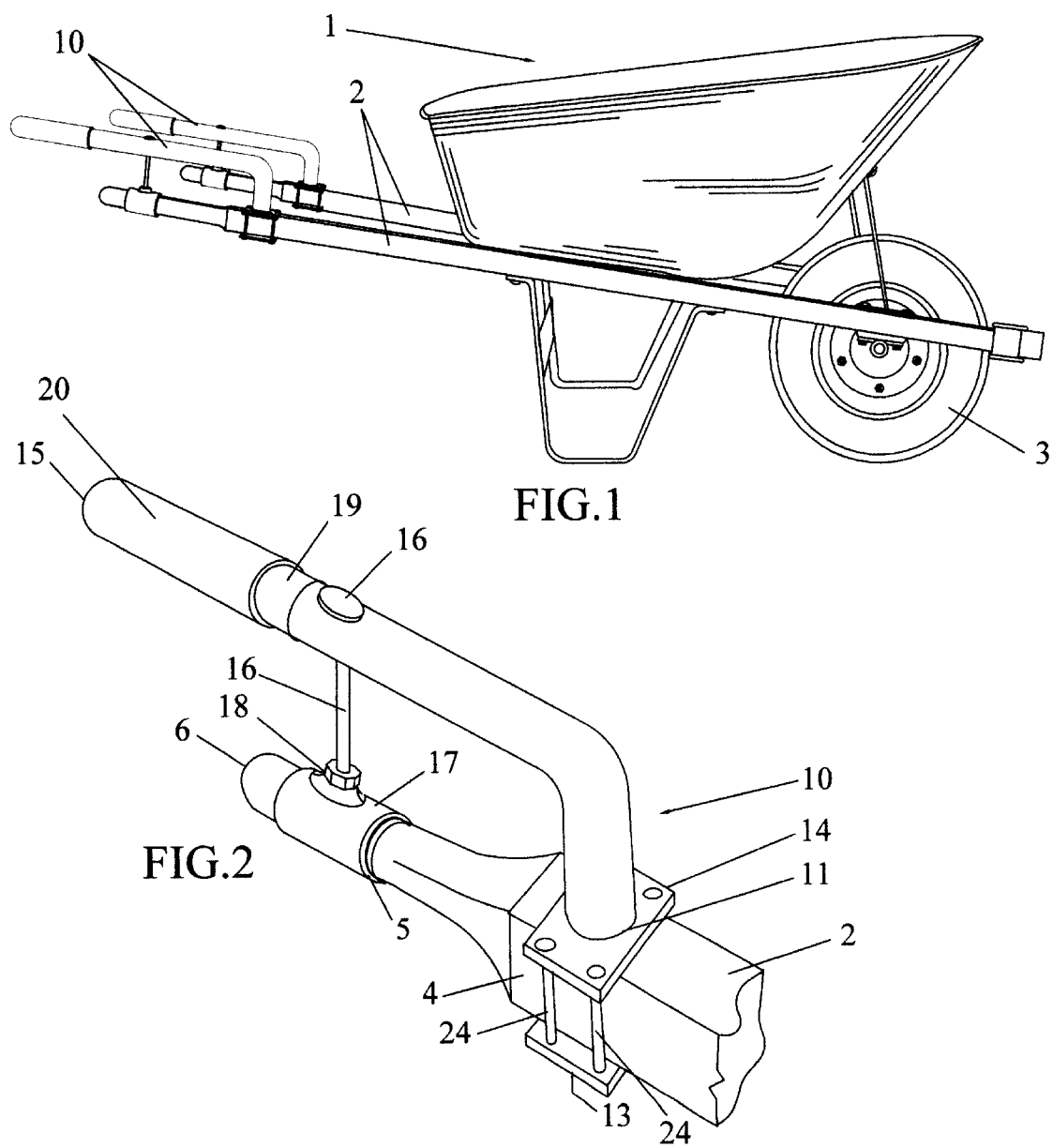

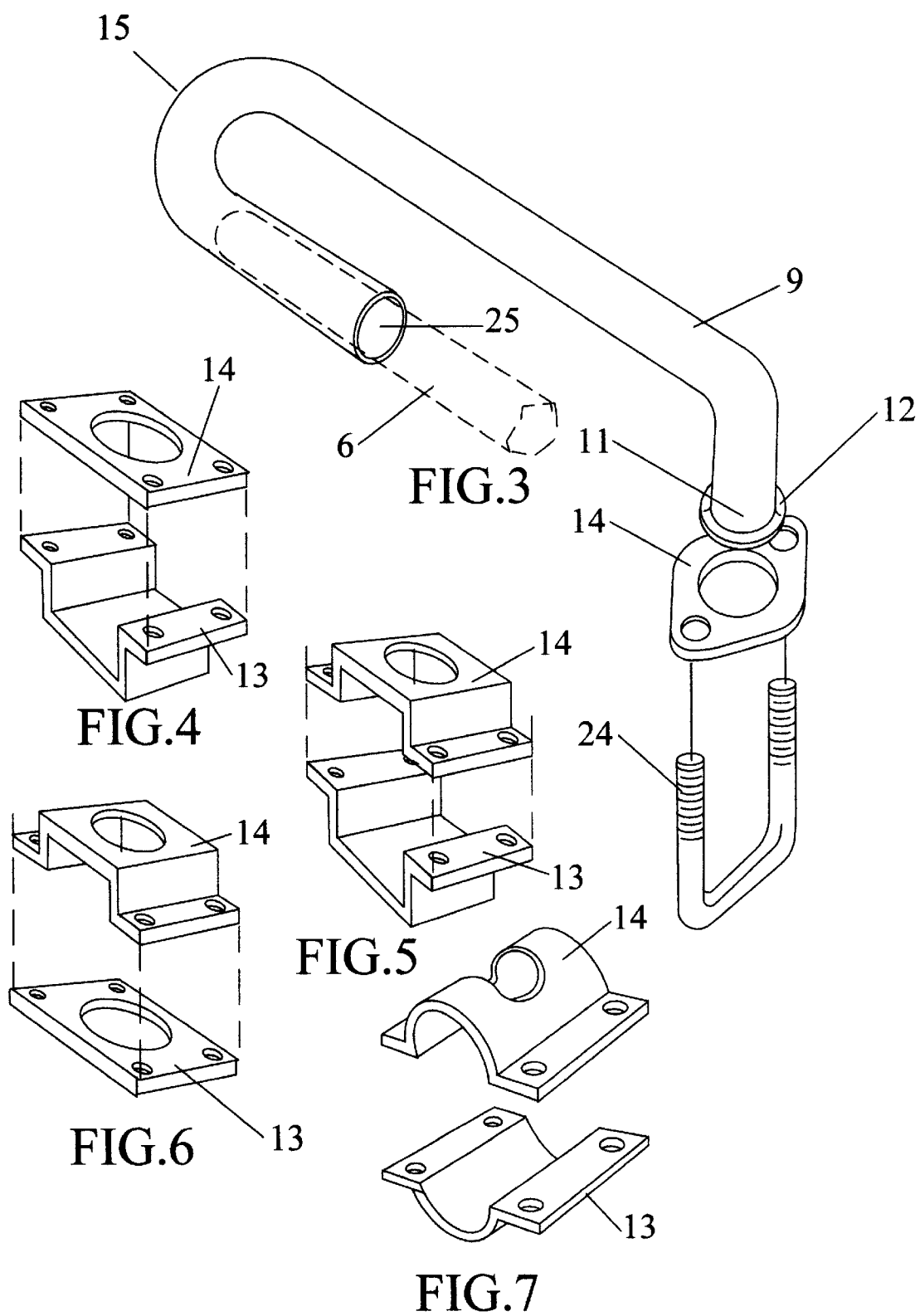

WHEELBARROW HANDLE ADAPTER

This application claims the benefit of U.S. Provisional Application No. 60/195,630, filed Apr. 6, 2000.

BACKGROUND OF THE INVENTION

1. Field of the Invention

This invention relates to devices for attachment to wheelbarrow handles to extend the length or raise the height of the handles. The new device incorporates an extension handle for attachment at two positions on existing wheelbarrow handles.

2. Description of Related Art

1. Various extension handles or grips have been disclosed in related art for use with wheelbarrows. Most of these devices are designed to be clamped on or slidably engaged with existing wheelbarrow handles. As disclosed in U.S. Pat. No. 5,794,307, issued Aug. 18, 1998, an arcuate handle is clamped or bolted at two locations on an existing wheelbarrow handle. This device does not extend the length of the wheelbarrow handle due to the curved configuration of the added handle device. It does raise the height at the distal end of the wheelbarrow handle.

2. In the instance of U.S. Pat. No. 5,810,375, dated Sep. 22, 1998, extension handles are inserted onto the ends of existing wheelbarrow handles. The extension handles are fixed in place by bolts passing through holes in the existing handles. These added handles extend the length of the handle, but do not raise the height thereof.

3. U.S. Pat. No. 5,153,966, issued Oct. 13, 1992, discloses handle grips which are inserted onto the ends of existing wheelbarrow handles. The handle grips provide for ease of griping the wheelbarrow handle and provide a limited extension and raising of the handle distal end.

4. The present invention incorporates an approximate right angle bend extension handle to attach to existing wheelbarrow handles at two locations. A clamp or bolts and the like attach the proximal end of the extension handle to existing wheelbarrow handles. The handle is attached at a second location on the existing wheelbarrow handle by use of a sleeve and bolt or curvature of the distal end to attach to the end of the existing wheelbarrow handle. This configuration provides both an extension and a raising of the point at which the wheelbarrow handle may be gripped.

SUMMARY OF THE INVENTION

One object of the present invention is extension of the length of existing wheelbarrow handles. Another object is raising of the height of the location at which a wheelbarrow handle may be gripped.

In accordance with the description presented herein, other objectives of this invention will become apparent when the description and drawings are reviewed.

BRIEF DESCRIPTION OF THE DRAWING

FIG. 1 illustrates a perspective view of a wheelbarrow with handle adapters.

FIG. 2 illustrates a perspective view of the wheelbarrow handle adapter with sleeve and bolt attachment.

FIG. 3 illustrates a perspective view of the handle adapter with curved distal end.

FIG. 4 illustrates a perspective view of an alternate retainer and bracket.

FIG. 5 illustrates a perspective view of an alternate retainer and bracket.

FIG. 6 illustrates a perspective view of an alternate retainer and bracket.

FIG. 7 illustrates a perspective view of an alternate retainer and bracket.

DESCRIPTION OF THE PREFERRED EMBODIMENT

1. The wheelbarrow handle adapter has an adapter handle which is a generally hollow tube with an approximate right angle bend adjacent the first attachment location or proximal end. In one embodiment the adapter is attached at a second wheelbarrow handle location or position by means of a sleeve and a bolt. In a second embodiment the distal end of the adapter handle is curved to slip onto the end of the existing wheelbarrow handles.

2. Referring to FIGS. 1 and 2 a wheelbarrow (1) has handles (2) to be gripped and used to elevate the wheelbarrow either for movement on wheel (3) or to dump the contents of the wheelbarrow (1). Attached to handles (2) are handle adapters (10) which are attached at positions (4,5) on the existing handles (2).

3. The proximal end (11) of adapter handle (10) may be clamped, bolted, attached by use of U-bolt or like means for attachment. FIGS. 2 through 7 illustrate various configurations of retainers (13) and flanges (14) for use in attachment. In addition the proximal end (11) may be welded to a bracket (14) or attached by other known methods in the art. FIG. 2 illustrates the adapter proximal end (11) attached by use of a bracket (14) and retainer (13) through which bolts (24) are inserted and retained.

4. Intermediate the proximal end (11) and distal end (15) a handle bolt (16) is inserted through the adapter handle (10) and attached to a sleeve (17). The sleeve (17) is inserted over the end of the grip portion (6) of the handle (2) and positioned to receive handle bolt (16) at threaded attachment (18). The adapter handle (10) distal end (15) is of a length to extend the desired length of the wheelbarrow handles (2). The distal end (15) may incorporate grip sleeves (20). The distal end (15) tubular opening may have an extension element (19) inserted and retained which may be a wood dowel as an example for the end element of the handle adapter (10).

5. Referring to FIG. 3 an alternate embodiment is illustrated with the distal end (15) of the adapter handle (9) curved in a manner such that the tubular opening (25) may be inserted over the handle (6) end. In this embodiment the adapter (10) is positioned on the handle (6) with tubular opening (25) inserted over the grip portion of the end of the handle (6). The proximal end (11) is then attached to the handle (6) using a flange (12) and bracket (14) as disclosed in the first embodiment.

6. While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for attachment to a wheelbarrow handle comprising:

an adapter handle having a distal end and a proximal end and intermediately therebetween an approximate right angle bend;

a sleeve insertable onto a wheelbarrow handle;

a handle bolt attached between the adapter handle and the sleeve intermediate the distal end and the proximal end; and the proximal end attachable to a wheelbarrow handle by a means for attachment.

2. The device as in claim 1 wherein the adapter handle is of tubular construction.

3. The device as in claim 1 wherein the adapter handle has a substantially rectangular cross-sectional surface area.

4. The device as in claim 1 wherein the adapter handle having a circular cross-section wood extension element attached at the distal end.

5. The device as in claim 1 wherein the distal end having a grip sleeve inserted thereon.

6. The device as in claim 1 wherein the handle bolt is attached to the sleeve by a threaded attachment means.

7. The device as in claim 1 wherein the means for attachment is the proximal end having a flange, which is attached to a bracket and by a plurality of bolts to a retainer.

8. The device as in claim 1 wherein the means for attachment is the proximal end having a flange and a bracket, which is attached by a U-bolt.

* * * * *